May 28, 1968     C. SAVIN ETAL     3,384,975
DEVICE AND METHOD FOR DERIVING THE FORMULA FOR THE
CIRCUMFERENCE OF A CIRCLE
Filed Oct. 22, 1965
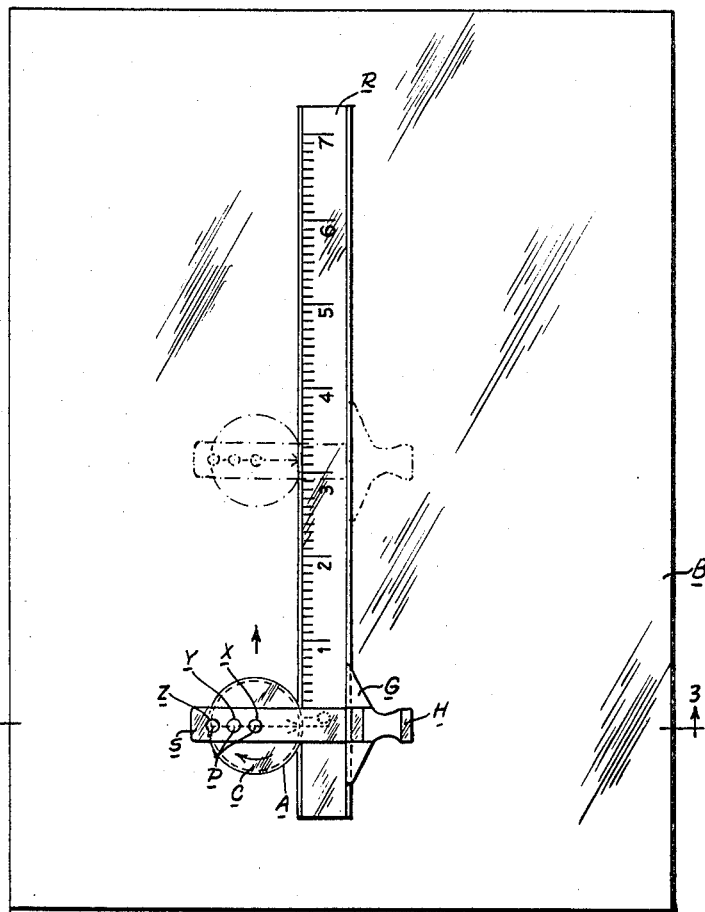
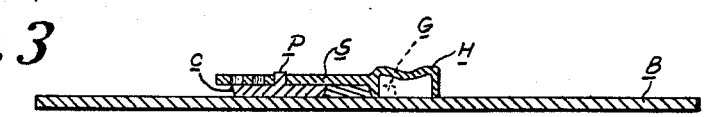
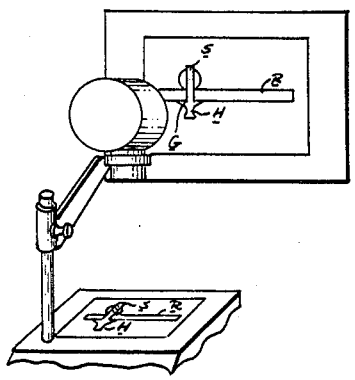
INVENTORS
CORNELIUS SAVIN
ALAN G. VORWALD
CHRISTOPHER P. VAGTS
BY R. E. Meech
ATTORNEYS.

United States Patent Office 3,384,975
Patented May 28, 1968

3,384,975
DEVICE AND METHOD FOR DERIVING THE FORMULA FOR THE CIRCUMFERENCE OF A CIRCLE
Cornelius Savin, Westbury, Alan G. Vorwald, Bethpage, and Christopher R. Vagts, Huntington, N.Y., assignors to Antran Corporation, a corporation of New York
Filed Oct. 22, 1965, Ser. No. 501,333
5 Claims. (Cl. 35—34)

ABSTRACT OF THE DISCLOSURE

An animated transparency device and method for demonstrating visually the characteristics and area of a circle and deriving the formula for the circumference thereof and its relation to pi comprising a graduated track member mounted on a base member having a cursor mounted thereon for movement therealong, and a plurality of circular members of known diameters adapted to be rotatably attached to said cursor for movement along one edge of said track member for measuring the circumference thereof, all of said members being made of a transparent material of identifying and contrasting colors adapted to be projected on a screen by an overhead projector.

This invention relates to a device for visual presentation to large groups of students at one time by overhead projection of a transparent device, and more particularly, to a animated transparency device for and method of teaching mathematical concepts, especially in geometry, by use thereof.

Oftentimes it is difficult for a student especially if he is lacking in imaginative power to grasp the significance of mere drawn lines and their proposed super-position upon each other especially, for example, where geometric concepts are to be developed in relation to the circle, its characteristics, and measurement. The student's mind can often be helped if such circles, lines, angles, etc. can be represented in a tangible form. In order to overcome this disadvantage, a device is provided, in accordance with the present invention, whereby circles, lines, angles, etc. of various types are represented in concrete form and the parts of the device manipulated in order to illustrate many of the elementary geometrical terms and processes employed in making proofs necessary in this branch of mathematical science.

While various devices and methods have been heretofore suggested and used for teaching or training large groups by means of overhead projection of transparent devices, they were not entirely satisfactory. One such device heretofore suggested employed a so-called "still" transparency. Such "still" transparency devices are merely two-dimensional, while animated transparencies are tri-dimensional which is decided advantage. Animation imparts a lively and more significant movement to the transparency and is much more easily understood. The modern method of teaching tends toward visualizing, manipulating and direct observation which is a decided advantage of teaching by animated transparencies. The inadequacies of these and other existing teaching means and methods is overcome by the present invention.

It is the general object of the present invention to provide animated teaching devices that overcome the insufficiencies of models, facsimiles, cut-away units and other means that have been previously employed to represent circles, angles, etc. for the purpose of teaching students and others.

It is another object of the invention to provide animated teaching devices of such character that each of the several components or parts of the assembly are readily visible and the relative movements of the related parts are all readily visible and understood. The several parts, or at least some of them, are constructed of transparent materials which are of different colors or shades for ready identification so that even though the parts are superimposed or positioned one within or behind the other, they are all immediately and readily recognizable and their several independent and mutual motions are clearly visible and understood.

It is a further object of this invention to provide a teaching aid of the animated transparency type which may be manipulated or actuated even by the student, himself, to observe the various components perform their respective functions and to solve the particular problem.

It is still another object of the present invention to provide animated transparency devices which are compact, light in weight and conveniently portable so as to facilitate handling, transporting, and storing of the devices.

It is still a further object of the invention to provide teaching devices of this type which are relatively inexpensive in their manufacture and which may be readily duplicated or produced in volume and, at the same time, efficient, effective and instructive in their use.

It is a most important object of the present invention to provide a method of and means for teaching mathematical concepts by the overhead projection of animated transparency devices which visually demonstrates the particular problem to be solved.

It is still a more specific object of this invention to provide a method of teaching the geometric concepts of the circle by overhead projection of an animated transparency device, wherein a circular member or members of a known diameter are moved rotatably along the edge of a ruler so as to visually demonstrate the circumference thereof and then to compare the value of the circumference with its diameter and radius.

Various other objects and advantages of this invention will be more apparent in the course of the following specification, and will be particularly pointed out in the appended claims.

In the accompanying drawings, there is shown for the purpose of illustration, an embodiment which the invention may assume in practice.

In these drawings:

FIG. 1 is a plan view of the animated transparency device in accordance with the present invention, FIG. 2 is a plan and side view of three circular members which are used with device of this invention, FIG. 3 is a sectional view taken on line 3—3 of FIG. 1, and FIG. 4 is a perspective view of a portion of an overhead projector and screen used in connection with the visual demonstration of the animated transparency device of the present invention.

Referring more particularly to the drawings, the animated transparency device in accordance with the present invention consists of the following parts, preferably a clear transparent plastic planar base B, an elongated ruler track member R mounted thereon having indicia graduated in tenths of an inch arranged along one marginal edge portion thereof, a slider or cursor S having a handle H and guide portion G arranged at one end thereof with series of holes, three, in the present instant, as indicated at X, Y and Z, are arranged in the opposite end, and preferably three plastic circular members C of one inch, one and one-half inch, and two inches in diameter. On each circular member there is provided a pin portion P arranged in the center thereof which is adapted to fit in the respective holes X, Y and Z in the slider S. Each of these circular members C has a hair-line arranged diametrtically thereof preferably terminating at one end in an arrow A.

Having described the parts and construction of the animated transparency device of the present invention, it functions and is used in the following manner.

The device is positioned, as shown in FIG. 4, on an overhead projector stage with the parts thereof satisfactorily focused on a screen in a well known manner. The one inch diameter plastic circular member is preferably first selected and placed on the transparent base B with periphery thereof in contact with the edge of the ruler R, as shown in FIG. 1. The slider S is then positioned over the ruler and over the circular member with circular projector P thereof positioned in the appropriate hole of the slider for rotating and moving the same along the ruler.

The slider S and circular member C is then adjusted so that the point of the arrow A is positioned directly opposite zero mark of the indicia or the ruler, as shown in the full lines of FIG. 1, and so that the hair-line is perpendicular to the edge of the ruler. The handle of the slider or cursor S is then grasped by the instructor and the assembly moved to the right, as shown in FIG. 1, exerting a slight pressure on the assembly so as to hold the circular member securely against the edge of the ruler and so that the circular member be sure to rotate when the slider or cursor is moved.

The circular member C is moved through a complete revolution or turn thereof at which time the point of the arrow will again be positioned opposite the indicia of the ruler with the hair-line perpendicular to the ruler edge, as shown in the broken lines of FIG. 1. The indicia on the ruler is then read and this value is the circumference of the circular member.

This circumference of this circular member is then compared with the diameter by dividing the circumference by its diameter circumference/diameter or $C/D = 3.15/1 = 3.15$ This result is then recorded preferably in a manner hereinafter set forth. This can be done preferably on the clear plastic transparency by the use of a felt pen so that it is readily visible to the students.

The above steps for each of the other two circular members is repeated and the circumference of the respective circular members and respective diameters preferably tabulated as follows:

| Diameter (d) | Circumference (c) | Ratio (c/d) |
| --- | --- | --- |
| 1″ | 3.15 | 3.15/1 = 3.15 |
| 1½″ | 4.73 | 4.73/1.5 = 3.15 |
| 2″ | 6.25 | 6.25/2 = 3.13 |

The results in the above table are then analyzed searching for similarities and patterns and it will be observed the circumference of each circular member divided by its respective diameter is of a value between 3.1 and 3.2. Hence, it can be stated that the circumference of a circle is a little more than three times its diameter.

The students can then be told that it has been found that mathematicians have calculated the value of the ratio ($c/d$) to hundreds of decimal places. The result being a constant pi, which is represented by $\pi$.

Thus, if $C/d = \pi$, then $C = \pi d$

This is the formula for circumference of a circle in the terms of its diameter.

As a result it will be seen that the animated transparency device in accordance with the present invention can be used to demonstrate visually the direct measurement of the approximate circumference of a circle, deriving the formula for the circumference of a circle experimentally, and for determining experimentally the value of pi.

While there is shown and described an embodiment which the invention may assume in practice, it will be understood that this embodiment is merely for the purpose of illustration and description, and that other forms may be devised within the scope of the invention as defined in the appended claims.

We claim:

1. An animated transparency device adapted to be used with an overhead projector for visually demonstrating the relation of the circumference of a circle to its diameter comprising a transparent planar base adapted to be positioned upon the stage of the projector, an elongated ruler mounted on said base, said ruler having indicia arranged thereon, a slide member mounted on said idler, and a circular member of a known diameter pivotally attached to said slide member which is adapted to travel along the edge of said ruler adjacent the the indicia thereon upon movement of said slide member along said ruler, said circular member having a hair-line arranged diametrically thereacross which is adapted to cooperate with the indicia on said ruler for measuring the circumference of the circular member by projecting the members on a screen by means of an overhead projector, all of said members being in contrasting identifying colors and constructed of a transparent material.

2. An animated transparency device as defined in claim 1, wherein the indicia on the ruler is graduated in tenths of an inch.

3. An animated transparency device adapted to be used with an overhead projector for teaching geometry comprising a transparent planar base adapted to be positioned upon the stage of the projector, an elongated track member positioned on said base having ruled indicia arranged along one marginal edge, a cursor slidably arranged on said track, said cursor having a guide portion and handle disposed on one side of said track member, and a circular member pivotally attached thereto and disposed on the opposite side of said track member with the periphery thereof adapted to travel along the edge of said track adjacent the indicia thereon, said circular member having a hair-line arranged diametrically thereof which is adapted to cooperate with said indicia for measuring the circumference of the circular member by projecting the members on a screen by means of an overhead projector, all of said members being in contrasting identifying colors and constructed of a transparent material.

4. An animated transparency device as defined in claim 3, wherein the ruled indicia is graduated in tenths of an inch.

5. An animated transparency device adapted to be used with an overhead projector for teaching geometry comprising a transparent planar base member adapted to be positioned upon the stage of the projector, an elongated track member positioned on said base member having ruled indicia graduated in tenths of an inch arranged along one marginal edge, a cursor slidably arranged on said track, said cursor having a guide portion and handle disposed on one side of said track member, and any one of several circular members of predetermined diameters adapted to be pivotally attached to said cursor and disposed on the opposite side of said track member from said handle with the periphery of said circular members adapted to travel along the edge of said track adjacent the indicia thereon, each of said circular members having a hair-line arranged diametrically thereof which is adapted to cooperate with said indicia for measuring the circumference of any one of the circular members for the purpose of deriving the formula therefor, all of said members being in contrasting identifying colors and constructed of a transparent material.

References Cited

UNITED STATES PATENTS

| | | | |
|---|---|---|---|
| 2,841,889 | 7/1958 | Coale et al. | 35—9 |
| 3,005,269 | 10/1961 | Woolley. | |
| 3,204,344 | 9/1965 | McMeen | 35—31.1 |

OTHER REFERENCES

Transparent Visual-Aids, brochure of the Physics Research Laboratories, Inc., page 2, Nov. 7, 1961.

EUGENE R. CAPOZIO, *Primary Examiner.*

W. H. GRIEB, *Examiner.*